Patented Mar. 12, 1946

2,396,608

UNITED STATES PATENT OFFICE 2,396,608

PROCESS FOR PRODUCING A SHELLAC SUBSTITUTE

Moses Rogovin, New York, N. Y.

No Drawing. Application May 18, 1943,
Serial No. 487,506

4 Claims. (Cl. 260—102)

This invention relates to a novel form of coating composition, as well as a method of producing the same. In its more specific aspects, the invention contemplates the providing of a material which will be eminently satisfactory as a shellac substitute.

It is known that a shellac substitute can be obtained by nitration of any kind of rosin or rosin oils. However, the practical application of this process has shown that the end-products obtained differ in their chemical and physical characteristics in each separate case of nitration. This lack of uniformity obviously renders such a process and product commercially undesirable if not wholly unusable.

Thus, it is an object of the present invention to provide a novel method of preparing a coating composition and by means of which such a composition—functioning as a shellac substiute—may be economically furnished.

I have established that by using rosin salts of the alkaline group as, for example, of potassium, ammonium, etc., instead of rosin for the nitration of the compound, complete and uniform nitrated end products are obtained.

By way of furnishing one practical example of procedure as well as one desired grouping of ingredients in accordance with the teachings of the present invention, I submit that the following ingredients may be employed:

| | Pounds |
|---|---|
| Rosin (water white—conveniently) | 1000 |
| Ethylenetetrachloride | 3500 |

This solution is subjected to constant agitation or stirring and ammonia gas is, for example, passed through the solution. This results in a mixture of ammonia resinate and ethylenetetrachloride.

An acid mixture is prepared including, for example, 500 lbs. of nitric acid, 782 lbs. of sulphuric acid and 298 lbs. of water. The nitric acid should be a concentrate and the water should be preferably chemically pure. This mixture is added to the aforedescribed mixture of ammonia resinate and ethylenetetrachloride in very small portions and under continuous agitation. During the mixing of these two groups, the temperature is maintained at a quite low point and the agitation is continued.

After the nitric-sulfuric acid-water mixture has been completely introduced, it is important that the cooling effect be continued. The temperature of the mixture should be maintained at not above 4° C. This low temperature and stirring or agitation are conveniently continued for a period of one-half an hour.

The acids are now separated from the solution of nitrated resin in ethylenetetrachloride. Thereafter, the mixture is washed with water until every trace of acid is eliminated from the solution. This may conveniently be achieved by a process of separation which is continued until the water incorporates no trace of acidity. To this end, the discharged water may be tested with litmus paper.

Thereupon, the nitrated rosins are freed from the ethylenetetrachloride. This may conveniently be achieved by employing a steam distillation process and apparatus. The substitute is now ready for use in virtually any connection in which shellac may ordinarily be employed.

The treated rosin or rosin salts may, for example, be melted and employed according to the technique which is ordinarily followed in this connection. If it is desired to employ the substitute in a solution, any proper fluid such as alcohol, acetone, etc., may be utilized. Again, customary technique may be followed.

Where, in the foregoing specification, I have referred to rosin, it is to be understood that, while I prefer to utilize this substance, I might, in certain instances, employ rosin oils. Insofar as my research has indicated, the rosin is infinitely to be preferred to the oils. Similarly, in lieu of other substances specified, their equivalents in function may be employed. Likewise, certain of the heretofore described steps of the method may be varied or modified as will appear from a review of the appended claims.

I claim:

1. A method of producing a shellac substitute which includes providing a dispersion in ethylenetetrachloride of a salt of rosin selected from the alkaline group consisting of potassium and ammonium, and adding thereto a mixture composed substantially of 40% by weight of concentrated nitric acid and 60% by weight of sulphuric acid in small quantities under constant agitation, maintaining the mixture at a temperature not substantially in excess of 4° C. above zero, and removing the traces of acids after nitration.

2. A method of producing a shellac substitute which includes dissolving rosin in ethylenetetrachloride, passing ammonia gas through the resultant solution thus forming a dispersion of ammonium salt of rosin in ethylenetetrachloride, nitrating this dispersion with a mixture of 40% by weight of concentrated nitric acid and 60% by weight of sulphuric acid and removing traces of acids after nitration.

3. A method of producing a shellac substitute, which includes dissolving rosin in a solution of ethylenetetrachloride, passing ammonia gas through the resultant solution, thus forming a dispersion of ammonium salt of rosin in ethylenetetrachloride, and nitrating this dispersion with a mixture of 40% by weight of a concentrated nitric acid and 60% by weight of sulphuric acid; such latter mixture being introduced into the dispersion of ammonium salt of rosin in ethylenetetrachloride in small quantities, and removing traces of acids after nitration.

4. A method of producing a shellac substitute which includes dissolving rosin in ethylenetetrachloride, passing ammonia gas through the resultant solution, adding to the resultant dispersion of ammonium salt of rosin in ethylenetetrachloride a mixture of substantially 40% by weight of concentrated acid and substantially 60% by weight of sulphuric acid; such latter mixture being introduced into the dispersion of ammonium salt in ethylenetetrachloride in small quantities under constant agitation, maintaining the mixture at a temperature not in excess of substantially 4° C. above zero and removing the traces of acids after nitration.

MOSES ROGOVIN.